United States Patent
Mathias et al.

(10) Patent No.: US 9,670,387 B2
(45) Date of Patent: Jun. 6, 2017

(54) ADHESIVE COMPOSITION INCLUDING DEACETYLATED CHITOSAN

(75) Inventors: Jean-Denis Mathias, Plauzat (FR); Michel Grediac, Aubiere (FR); Hélène De Baynast, Mozat (FR); Philippe Michaud, Billom (FR); Anil Patel, Clermont Ferrand (FR)

(73) Assignees: UNIVERSITE BLAISE PASCAL—CLERMONT II, Clermont-Ferrand (FR); INSTITUT NATIONAL DE RECHERCHE EN SCIENCES ET TECHNOLOGIES POUR L'ENVIRONNEMENT ET L'AGRICULTURE, Antony (FR)

( * ) Notice: Subject to any disclaimer, the term of this patent is extended or adjusted under 35 U.S.C. 154(b) by 931 days.

(21) Appl. No.: 13/810,308

(22) PCT Filed: Jul. 13, 2011

(86) PCT No.: PCT/FR2011/051687
§ 371 (c)(1),
(2), (4) Date: Feb. 20, 2013

(87) PCT Pub. No.: WO2012/007697
PCT Pub. Date: Jan. 19, 2012

(65) Prior Publication Data
US 2013/0143041 A1    Jun. 6, 2013

(30) Foreign Application Priority Data
Jul. 16, 2010  (FR) ..................... 10 55820

(51) Int. Cl.
*C09J 105/08*    (2006.01)
*C09J 105/00*    (2006.01)
*C08L 97/02*    (2006.01)
*C08L 5/08*    (2006.01)

(52) U.S. Cl.
CPC ............. *C09J 105/00* (2013.01); *C08L 97/02* (2013.01); *C09J 105/08* (2013.01); *C08L 5/08* (2013.01); *Y10T 428/2852* (2015.01); *Y10T 428/31678* (2015.04); *Y10T 428/31975* (2015.04)

(58) Field of Classification Search
None
See application file for complete search history.

(56) References Cited

U.S. PATENT DOCUMENTS 4,659,700 A * 4/1987 Jackson .............. A61L 26/0023
514/55
6,200,595 B1 * 3/2001 Motoyashiki ......... A61L 15/585
424/443

FOREIGN PATENT DOCUMENTS

WO    2005/033243 A1    4/2005
WO    WO2005/033243    *   4/2005

OTHER PUBLICATIONS

"Development of New Natural polymer-based wood adhesives". Kenji Umemura. 2010.*

(Continued)

*Primary Examiner* — Melvin C Mayes
*Assistant Examiner* — Colette Nguyen
(74) *Attorney, Agent, or Firm* — Young & Thompson

(57) ABSTRACT

The present invention relates to an adhesive composition comprising at least one deacetylated chitosan, an acid and an additional compound.

24 Claims, 1 Drawing Sheet

(56) References Cited

OTHER PUBLICATIONS

Kenji Umemura et al: "Development of new natural polymer-based wood adhesives III: effects of glucose addition on properties of chitosan", Journal of Wood Science Official Journal of the Japan Wood Research Society, Springer-Verlag, TO, vol. 56, No. 5, Jun. 7, 2010 (Jun. 7, 2010), pp. 387-394, XP019807514, ISSN: 1611-4663 abstract "Materials" on p. 388, Film preparation on p. 388, "Bonding properties" on pp. 392-393, table 1.
International Search Report, dated Oct. 24, 2011, from corresponding PCT application.

\* cited by examiner

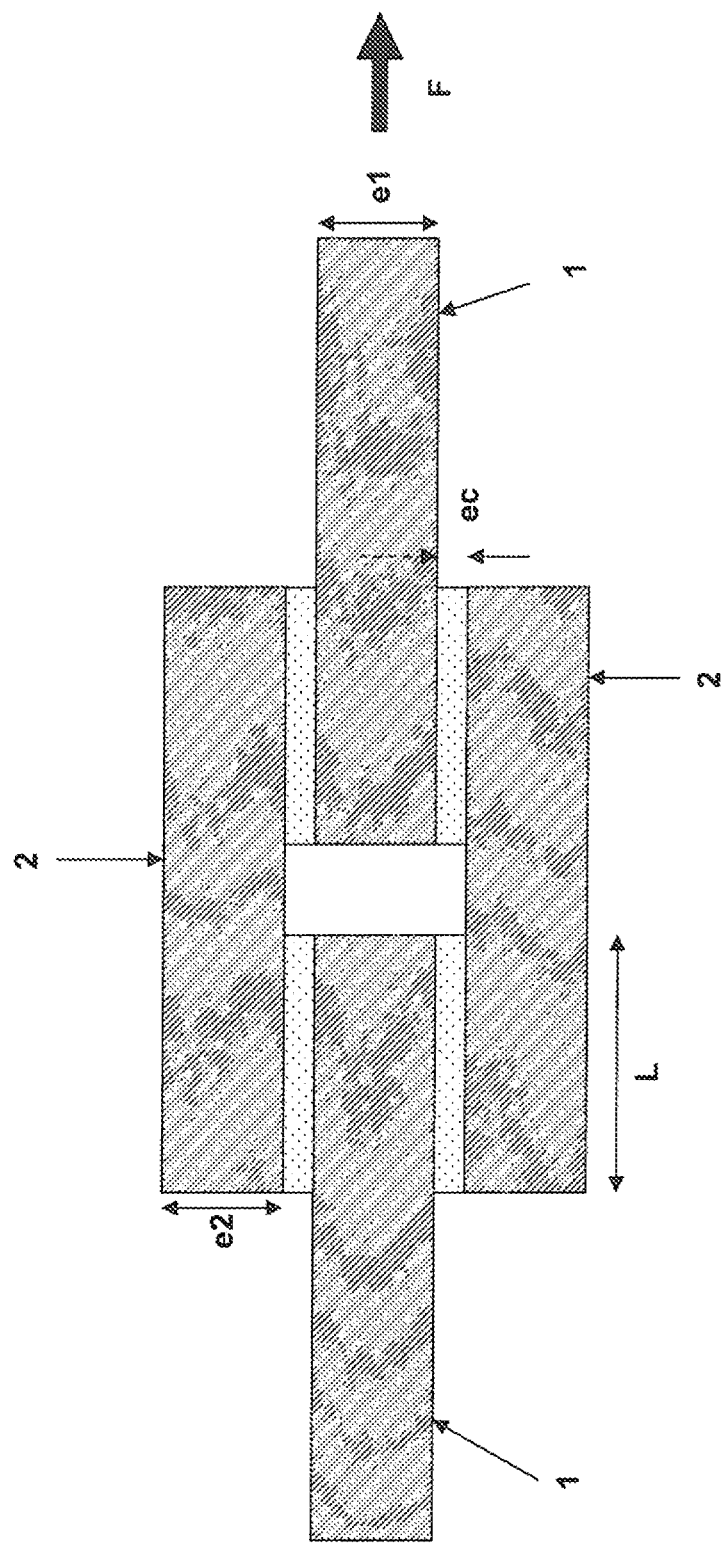

ADHESIVE COMPOSITION INCLUDING DEACETYLATED CHITOSAN

The invention relates to an adhesive composition as well as to an adhesive bonding method comprising the application of said composition. The invention more particularly relates to an adhesive composition comprising at least one deacetylated chitosan, an acid and an additional compound.

Structural adhesive bonding is a technology currently used for joining up all types of materials. It finds its application in many industrial fields such as the building industry, the automotive, aeronautical, railway, naval sector or further in wooden structures or structures for windows.

Structural adhesive bonding gives the possibility of making adhesively bonded assemblies which may withstand stresses as significant as those for mechanically welded assemblies Structural adhesives are generally designed in order to withstand shear stresses above 7 MPa.

The structural adhesives known today consist of materials of synthetic origin, such as polyurethanes, epoxides or acrylics and the presence of volatile organic compounds (VOCs) or other potentially toxic compounds in these adhesives represents a significant problem for human health and for the environment.

Polysaccharides have been identified as a potential alternative to the use of synthetic materials, and notably chitosan. Adhesive compositions comprising deacetylated chitosan solubilized in a solution of acetic acid give the possibility of improving the bonding of plywood boards (K. Umemura et al., Koen Yoshishu—Nippon Setchaku Gakkai Nenji Taikai, 2002, 40, 71-72). However the thereby obtained adhesive compositions cannot withstand shear stresses greater than or equal to 2 MPa.

Other compounds have been introduced into adhesive compositions based on deacetylated chitosan in order to improve the bonding force. Compositions comprising a deacetylated chitosan solubilized in a solution of acetic acid and associated with glucose have been described as giving the possibility of improving the bonding of plywood boards (K. Umemura, *Development of new natural polymer-based wood adhesives III: effects of glucose addition on properties of chitosan*, Journal of Wood Science, 2010). Nevertheless, these compositions cannot withstand shear stresses greater than or equal to 2.5 MPa.

Therefore, there exists today the need for obtaining adhesive compositions based on materials of natural origin having adhesive properties at least equivalent to those of synthetic materials and giving the possibility of limiting or even suppressing the risks on health and environment.

The present invention gives the possibility of providing a solution to partly all the problems of the state of the art.

A first goal of the present invention is therefore to provide an adhesive composition based on deacetylated chitosan and which may be applied to structural bonding, as well as a structural bonding method by applying said composition.

A second goal of the present invention is to provide an adhesive composition based on deacetylated chitosan, easy and inexpensive to formulate, as well as a simple and inexpensive structural bonding method to be applied.

A third goal of the present invention is to provide a composition based on deacetylated chitosan having both sufficient adhesive properties for structural bonding and antimicrobial properties.

A fourth goal of the present invention is to provide a composition based on deacetylated chitosan having sufficient adhesive properties for structural bonding while limiting the risks of withdrawal after application.

Thus, the present invention first of all relates to an adhesive composition comprising:
(a) from 3 to 10% by weight of at least one deacetylated chitosan having a deacetylation degree of more than or equal to 75%;
(b) from 0.5 to 5% by weight of at least one organic or inorganic acid;
(c) at least one compound selected from:
    (c1) from 0.001 to 8% by weight of a polyanionic compound,
    (c2) from 0.001 to 2% by weight of a polyol of formula $C_nH_{2n+2}O_n$ wherein n represents an integer comprised between 2 and 20,
(d) an additional amount of an aqueous support.

According to the invention, the composition comprises from 4 to 9% of chitosan preferably from 4 to 6%.

According to the invention, chitosan has a molar mass ranging from 5,000 to 1,200,000 g/mol, preferably from 10,000 to 500,000 g/mol.

As an example of chitosan, it is possible to select the product marketed by SIGMA ALDRICH under reference C3646-500G.

According to the invention, by applying an acid, it is possible to solubilize deacetylated chitosan in the composition according to the invention.

According to the invention, the composition advantageously comprises from 1 to 3% acid.

Advantageously, the acid is in an aqueous phase.

Advantageously, the acid aqueous solution has a pH ranging from 2 to 4, preferably ranging from 2 to 2.5.

According to the invention, the acid is advantageously an inorganic acid selected from known inorganic acids. Sulfuric acid, hydrochloric acid or nitric acid are mentioned as examples, advantageously sulfuric acid.

According to the invention, the acid is advantageously an organic acid selected from known organic acids. Advantageously, the organic acid is selected from carboxylic acids, preferably acetic acid.

According to the invention, the composition comprises from 0.01 to 5% of compound (c1).

According to the invention, the compound (c1) is advantageously selected from hydroxycarboxylic acids, polycarboxylic acids, hydroxypolycarboxylic acids, polysaccharides, salts or mixtures thereof.

According to the invention, the polysaccharides are selected from alginates, carrageenans, salts or mixtures thereof, preferably from sodium alginates or carrageenans.

Advantageously, the composition comprises from 2 to 5% of compound (c1).

According to the invention, the compound (c1) is selected from citric acid salts or succinic acid salts, preferably selected from trisodium citrate dihydrate.

Advantageously, the composition comprises from 0.05 to 1% of compound (c1)

According to the invention, the composition advantageously comprises from 0.5 to 1.5% of compound (c2).

According to the invention, the compound (c2) is a polyol for which n is comprised between 2 and 10. Advantageously, the polyol is selected from glycerol or mannitol.

According to the invention, the composition 1 comprises from 4 to 6% of chitosan or from 1 to 3% of acid or from 0.01 to 5% of compound (c1) or from 0.5 to 1.5% of compound (c2) or their total or partial combinations.

According to the invention, the composition comprises the compounds (a) and (b) in a ratio a/b ranging from 3/1 to 10/3, preferably ranging from 4/1 to 6/2.

According to the invention, the composition comprises the compound (a) and (c1) in a ratio (a)/(c1) ranging from 1/2 to 200/1, preferably ranging from 4/1 to 120/1.

According to the invention, the composition comprises the compounds (a) and (c2) in a ratio (a)/(c2) ranging from 2/1 to 12/1, preferably ranging from 8/3 to 7/1.

Advantageously, the support (d) is water. The support (d) may also comprise adjuvants; coloring agents or preservatives are mentioned as examples.

Further the composition according to the invention may also comprise a polysaccharide filler (e).

Advantageously, the polysaccharide filler (e) is different from the compound (c1).

According to the invention, the polysaccharide filler (e) is selected from starches, starch fractions and amylaceous flours.

Advantageously, the polysaccharide filler (e) is selected from starch from cereals, from potatoes, from wheat or from manioc, preferably a starch from cereals.

By starch fraction is meant one or several compounds stemming from the fractionation of starch.

Advantageously, the polysaccharide filler (e) is selected from amylopectin or amylose.

According to the invention, the polysaccharide filler (e) is selected from flour from cereals, chestnuts, horse chestnuts, millet, rice, buckwheat, quinoa, spelt, soya bean, peas, potatoes, or manioc.

According to the invention, the composition comprises from 0.1 to 20%, preferably from 1 to 15% by weight of polysaccharide filler (e).

According to the invention, the composition advantageously comprises the compounds (a) and (e) in a ratio ranging from 1/10 to 1/1.

Advantageously, the invention relates to an adhesive composition comprising:
(a) from 3 to 10% by weight of at least one deacetylated chitosan having a deacetylation degree greater than or equal to 75%;
(b) from 0.5 to 5% by weight of at least one organic or inorganic acid;
(c1) from 0.001 to 8% by weight of a polyanionic compound;
(c2) from 0.001 to 2% by weight of a polyol or formula $C_nH_{2n+2}O_n$ wherein n represents an integer comprised between 2 and 10;
(d) an additional amount of an aqueous support.

Advantageously, the composition further comprises from 0.1 to 20% of a polysaccharide filler (e).

The different characteristics described for the polysaccharide filler (e) also apply to this advantageous embodiment.

The invention also relates to a basic adhesive composition comprising:
(a) at least one deacetylated chitosan having a deacetylation degree greater than or equal to 75%,
(b) at least one organic or inorganic acid,
(c) at least one compound selected from the group formed by:
  (c1) polyanionic compounds,
  (c2) polyols of formula $C_nH_{2n+2}O_n$, n being comprised between 2 and 20,
(d) an aqueous support.

According to the invention, the basic adhesive composition further comprises a polysaccharide filler (e).

The different characteristics shown for the deacetylated chitosan (a) and the acid (b) as well as those relating to their ratio also apply to the basic adhesive composition according to the invention.

The different characteristics shown for the compounds (c1), (c2), (e) and the support (d) as well as those relating to the ratios (a)/(c1), (a)/(c2) and (a)/(e) also apply to the basic adhesive composition according to the invention.

According to the invention, the adhesive composition also has antimicrobial properties, thus giving the possibility of limiting, or even suppressing the risk of microbial proliferation with the object or the structure comprising said composition and thereby improving its lifetime.

According to the invention, the adhesive composition also has improved properties relating to withdrawal after application, thereby allowing a reduction in the amount of composition to be applied for obtaining a sufficient adhesive thickness for structural bonding.

By withdrawal, is meant the reduction in thickness, and therefore in the volume occupied by a composition layer after application.

According to the invention, the adhesive composition has a shear strength ranging from 7 to 100 MPa, preferably ranging from 10 to 50 MPa.

Another object of the present invention relates to a method for preparing an adhesive composition comprising the mixture:
(a) from 3 to 10% by weight of at least one deacetylated chitosan having a deacetylation degree greater than or equal to 75%;
(b) from 0.5 to 5% by weight of at least one organic or inorganic acid;
(c) at least one compound selected from:
  (c1) from 0.001 to 8% by weight of a polyanionic compound or
  (c2) from 0.001 to 2% by weight of a polyol of formula $C_nH_{2n+2}O_n$ wherein n represents an integer comprised between 2 and 20;
(d) an additional amount of an aqueous support.

Further, the mixture applied for the preparation method according to the invention may comprise a polysaccharide filler (e).

Advantageously, the method is used for preparing an adhesive composition according to the invention.

The whole of the different features or preferences of the composition according to the invention described for the deacetylated chitosan (a) and the acid (b) as well as those relating to their ratio also apply to the preparation method according to the invention.

The whole of the different features or preferences of the composition according to the invention described for the compounds (c1), (c2), (e) and the support (d) as well as those relating to the ratios (a)/(c1), (a)/(c2) and (a)/(e) also apply to the preparation method according to the invention.

Another object of the present invention relates to a composition obtained or which may be obtained by the preparation method according to the invention.

Another object of the invention relates to an adhesive bonding method by applying an adhesive composition according to the invention.

Another object of the present invention relates to an adhesive bonding method comprising the application of an adhesive composition comprising:
(a) from 3 to 10% by weight of at least one deacetylated chitosan having a deacetylation degree great than or equal to 75%;

(b) from 0.5 to 5% by weight of at least one organic or inorganic acid;
(c) at least one compound selected from:
  (c1) from 0.001 to 8% by weight of a polyanionic compound,
  (c2) from 0.001 to 2% by weight of a polyol of formula $C_nH_{2n+2}O_n$ wherein n represents an integer comprised between 2 and 20,
(d) an additional amount of an aqueous support.

Further, the adhesive composition according to the invention may comprise a polysaccharide filler (e).

Advantageously, the adhesive bonding method according to the invention is applied for structural bonding of a structure by applying the adhesive composition on the surface of at least one element of the structure.

By structure, is meant any assembly of at least two elements of the same nature or of different natures.

According to the invention, the adhesive composition is applied on the surface of all the elements of the structure.

The whole of the different features or preferences of the composition according to the invention described for deacetylated chitosan (a) and the acid (b) as well as those relating to their ratio also apply to the adhesive bonding method according to the invention.

The whole of the different features or preferences of the composition according to the invention described for the compounds (c1), (c2), (e) and the support (d) as well as those relating to the ratios (a)/(c1), (a)/(c2) and (a)/(e) also apply to the adhesive bonding method according to the invention.

According to the adhesive bonding method of the invention, the element of the structure comprises a material of natural origin, a metal or its alloys, a plastic material, a ceramic or mixtures thereof.

Advantageously, the element comprises a cellulose material, preferably wood, a product derived from wood, a byproduct of wood.

Also advantageously, the element comprises aluminum or its alloys. The aluminum alloy 2014 is mentioned as an example.

According to the invention, the adhesive bonding method may comprise a preliminary step for preparing, by chemical and mechanical treatment, the surface of the structure or at least one element of the structure.

Advantageously, the treatment is a chemical treatment, preferably a treatment with soda.

Another object of the invention relates to a composite object comprising an adhesive composition according to the invention and at least one element comprising another material.

By a composite object is meant any object comprising at least two elements which may be of the same nature or of different natures.

According to the invention, the material is selected from cellulose materials, metals and their alloys, plastic materials, ceramics or mixtures thereof. Advantageously, the material is wood, a product derived from wood, a byproduct of wood or an aluminum alloy. The aluminum alloy 2014 is mentioned as an example.

The composite object may notably appear as a wooden structure comprising at least two wooden elements attached to each other by means of the adhesive composition according to the invention. Beams, struts or wooden frames are mentioned as examples of wooden elements.

The composite object may also appear in the form of glue-laminated wooden elements currently called "gluelam" comprising wooden strips adhesively bonded by means of a composition according to the invention. Spruce, Douglas fir strips are mentioned as examples of wooden strips.

FIG. 1 shows a test specimen with which it is possible to determine the shear strength of an adhesive composition according to the invention.

The different objects of the invention and their embodiments will be better understood upon reading the examples which follow. These examples are given as an indication, without any limitation.

EXAMPLES

For each of the following examples, the aluminum alloy test specimens were made in the following way.

Each aluminum alloy test specimen consisted of four aluminum alloy 2014 elements with a length equal to 150 mm, with a width equal to 20 mm and with thicknesses $e_1$ and $e_2$ equal to 2 mm, two outer elements 2, and two inner elements 1. First, each aluminum alloy element has been soaked in trichloroethylene for 30 mins in order to remove the oils, each element having then been cleaned with a detergent and dried at room temperature. Next, each element has undergone a surface treatment by soaking in a 1 M soda solution for 1 hour. Next, each element was thoroughly washed with a mild detergent and kept for 12 hours in a 2% acetic acid aqueous solution. Next, each element was again washed and dried at room temperature.

The adhesive composition was applied to the surface of each inner aluminum alloy element 1 with thickness $e_1$ in order to form a layer with an initial thickness $e_c$ of 1 mm, the obtained final layer being thinner after drying, in order to form a test specimen according to FIG. 1. Each aluminum alloy element 2, of thickness $e_2$ was attached to the other elements 1 and kept for 48 hours at a temperature of 40° C. The overlapping length is equal to L.

Each test specimen was then subject to measurement of the tensile strength. For this, a tensile measurement method based on the ASTM D3528 standard was used. The apparatus used is a machine marketed by Zwick Roell under reference UTS Test System type BZC associated with the software package Text-expert VII 02 marketed by TestXpert Machine. The test specimens are subject to an imposed displacement according to a rate of 0.005 mm/s until breaking and the tensile strength F is thus measured for each test specimen.

From the tensile strength, the shear strength of each exemplified adhesive composition was calculated expressed in MPa and resulting from the following mathematical formula, drawn from the Volkersen theory (Volkersen, *Luftfahrtforschung*, 15, 1938, pp. 41-47):

$$\tau(0) = \frac{G_c \sigma_0}{\sinh(\lambda_i L) e_c \lambda_i E_1} \left( \frac{E_1 e_1}{E_2 e_2} + \cosh(\lambda_i L) \right)$$

wherein:
$\sigma_0 = F/S$,
S being the section of the elements 1,
F corresponding to the tensile strength of the test specimen,
$e_1$ and $e_2$ corresponding to the thicknesses of the elements 1 and 2,
$e_c$ corresponding to the thickness of the adhesive composition,
$E_1$ and $E_2$ corresponding to the Young moduli of elements 1 and 2, L corresponding to the overlapping length of the elements 1 and 2, $$\lambda_i = \sqrt{\frac{G_c}{e_c}\left(\frac{1}{e_1 E_1} + \frac{1}{e_2 E_2}\right)},$$

wherein:
$G_c = E_c/(2(1+\nu))$ and corresponding to the shear modulus of the adhesive composition. For calculating it, it is assumed that the Poisson coefficient $\nu$ is equal to 0.3 and Young's modulus $E_c$ was measured to be 2 GPa.

Example 1

Evaluation of the Shear Strength of Adhesive Compositions According to the Invention 3 test specimens were made by using a composition according to the invention respectively comprising 6% of deacetylated chitosan having a deacetylation degree greater than or equal to 75%, 2% of acetic acid and a variable content of trisodium citrate dihydrate equal to 0.08, 0.14 and 0.5%. The control test specimen was made by using a composition comprising 6% of deacetylated chitosan with a deacetylation degree greater than or equal to 75% and 2% of acetic acid.

The shear strength values are shown in Table I.

TABLE I

| Adhesive composition | Shear strength (MPa) |
|---|---|
| Control | 16.5 |
| 6% chitosan 2% acetic acid 0.08% citrate | 28.4 |
| 6% chitosan 2% acetic acid 0.14% citrate | 29.8 |
| 6% chitosan 2% acetic acid 0.5% citrate | 24.5 |

The results show that the compositions according to the invention exhibit an enhanced shear strength.

Example 2

Evaluation of the Shear Strength of Adhesive Compositions According to the Invention 3 test specimens were made by using a composition according to the invention respectively comprising 6% of deacetylated chitosan having a deacetylation degree greater than or equal to 75%, 2% of acetic acid and a variable glycerol content equal to 0.5, 1 and 1.5%. The control test specimen was made by using a composition comprising 6% of deacetylated chitosan having a deacetylation degree greater than or equal to 75% and 2% of acetic acid.

The shear strength values are shown in Table II.

TABLE II

| Adhesive composition | Shear strength (MPa) |
|---|---|
| Control | 16.5 |
| 6% chitosan | 25 |

TABLE II-continued

| Adhesive composition | Shear strength (MPa) |
|---|---|
| 2% acetic acid 0.5% glycerol 6% chitosan 2% acetic acid 1% glycerol | 26.2 |
| 6% chitosan 2% acetic acid 1.5% glycerol | 24.7 |

The results show that the compositions according to the invention exhibit enhanced shear strength.

Example 3

Evaluation of the Shear Strength of Adhesive Compositions According to the Invention 5 test specimens were made by using a composition according to the invention respectively comprising 5% of deacetylated chitosan with a deacetylation degree greater than or equal to 75%, 1% of acetic acid, a variable glycerol content equal to 0.5, 1 and 1.5% and a variable content of trisodium citrate dihydrate equal to 0.11, 0.14 and 0.17%. The control test specimen was made by using a composition comprising 5% of deacetylated chitosan with a deacetylation degree greater than or equal to 75% and 1% of acetic acid.

The shear strength values are shown in Table III.

TABLEAU III

| Adhesive composition | Shear strength (MPa) |
|---|---|
| Control | 22.2 |
| 5% chitosan 1% acetic acid 0.5% glycerol 0.14% citrate | 31.8 |
| 5% chitosan 1% acetic acid 1% glycerol 0.14% citrate | 33.9 |
| 5% chitosan 1% acetic acid 1.5% glycerol 0.14% citrate | 28.4 |
| 5% chitosan 1% acetic acid 1% glycerol 0.11% citrate | 33 |
| 5% chitosan 1% acetic acid 1% glycerol 0.17% citrate | 34.7 |

The results show that the compositions according to the invention exhibit enhanced shear strength.

Example 4

Comparison of the Shear Strength Between an Adhesive Composition According to the Invention and a Synthetic Structural Adhesive 2 test specimens were made:
the first test specimen by using a composition according to the invention comprising 6% of deacetylated chitosan having a degree of deacetylation greater than or equal to 75%, 2% of acetic acid and 1% glycerol, the second one by using a structural adhesive based on epoxide marketed under the name of Epoxy adhesive E-504 by EPOTECHNY. The aluminum alloy elements forming the second test specimen were attached to the other ones and kept for 40 hours at temperature of 40° C. The shear strength values are shown in Table IV.

TABLE IV

| Adhesive composition | Shear strength (MPa) |
|---|---|
| Composition according to the invention 6% chitosan 2% acetic acid 1% glycerol | 39.4 |
| Epoxy adhesive E-504 | 39.1 |

The results show that the adhesion properties of a composition according to the invention are equivalent to those of an adhesive based on epoxides and therefore the compositions according to the invention represent an alternative to structural adhesives of synthetic origin.

Example 5

Evaluation of the Adhesion Thickness of Adhesive Compositions According to the Invention The adhesion thickness was determined for the following adhesive compositions:

a composition comprising 4% chitosan (Sigma Aldrich; molecular weight: $3.308.10^5$ g/mol) and 1% acetic acid, a composition containing 6% chitosan, 1% acetic acid, 1% glycerol and 0.14% citrate, a composition comprising 6% chitosan, 1% acetic acid, 1% glycerol, 0.14% citrate and 10% soluble wheat starch.

The adhesive thickness measurements were conducted in a beaker of 50 ml, on wooden parts ($27 \times 27 \times 9$ mm$^3$) and on aluminum test specimens treated with soda as shown in FIG. 1 (dimensions of each element 1 and 2: $350 \times 20 \times 2$ mm$^3$; dimension of each overlapping area between the elements 1 and 2: 1,000 mm$^2$).

The adhesive composition was applied in an identical way for each of the supports and the final thickness was measured by means of a sliding caliper.

The values of the adhesive thickness are shown in Tables V, VI and VII below and are expressed in mm:

TABLE V

| | beaker | | |
|---|---|---|---|
| | Applied volume (ml) | | |
| Adhesive composition | 2.5 | 5 | 7.5 |
| 4% chitosan 1% acetic acid | 0.085 | 0.155 | 0.29 |
| 6% chitosan 1% acetic acid 1% glycerol 0.14% citrate | 0.215 | 0.47 | 0.66 |
| 6% chitosan 1% acetic acid 1% glycerol 0.14% citrate 10% starch | 0.225 | 0.515 | 0.83 |

TABLE V

| | wooden parts | | |
|---|---|---|---|
| | Applied volume (ml) | | |
| Adhesive composition | 2.5 | 5 | 7.5 |
| 4% chitosan 1% acetic acid | 0.07 | 0.1 | 0.315 |
| 6% chitosan 1% acetic acid 1% glycerol 0.14% citrate | 0.051 | 0.061 | 0.236 |
| 6% chitosan 1% acetic acid 1% glycerol 0.14% citrate 10% starch | 0.3 | .08 | 0.9 |

TABLE VII

| | aluminum test specimens | | |
|---|---|---|---|
| | Applied volume (ml) | | |
| Adhesive composition | 2.5 | 5 | 7.5 |
| 4% chitosan 1% acetic acid | 0.04 | 0.02 | 0.02 |
| 6% chitosan 1% acetic acid 1% glycerol 0.14% citrate | 0.035 | 0.02 | 0.045 |
| 6% chitosan 1% acetic acid 1% glycerol 0.14% citrate 10% starch | 0.6 | 0.51 | 0.2 |

The above results show that the thickness of the adhesive composition according to the invention after application is improved as compared with a composition only comprising chitosan and acetic acid, and thus that the composition according to the invention has better properties relatively to withdrawal.

It should be noted that by adding starch in the composition according to the invention as a polysaccharide filler, it is possible to significantly reduce withdrawal.

Example 6

Evaluation of the Influence of the Presence of Starch on the Shear Strength of an Adhesive Composition Based on Chitosan Shear strength measurements were conducted like in Examples 1, 2, 3 and 4.

The following compositions were tested:

a composition comprising 4% chitosan and 1% acetic acid, a composition comprising 4% chitosan, 1% acetic acid and 5% of soluble wheat starch, a composition comprising 4% chitosan, 1% acetic acid and 10% soluble wheat starch.

The results are shown in the Table VIII below:

TABLE VIII

| Adhesive composition | Shear strength (MPa) |
|---|---|
| 4% chitosan 1% acetic acid | 20.1 |

TABLE VIII-continued

| Adhesive composition | Shear strength (MPa) |
|---|---|
| 4% chitosan<br>1% acetic acid<br>5% starch | 19.5 |
| 4% chitosan<br>1% acetic acid<br>10% starch | 20.6 |

The results above show that the addition of starch in an adhesive composition based on chitosan does not have any significant influence on the adhesive properties of said composition.

These results thus show that the introduction of starch, in an adhesive composition according to the invention, does not alter the adhesive properties of said composition.

The invention claimed is:

1. An adhesive composition comprising:
   (a) from 3 to 10% by weight of at least one deacetylated chitosan having a deacetylation degree greater than or equal to 75%;
   (b) from 0.5 to 5% by weight of at least one organic or inorganic acid;
   (c1) from 0.001 to 8% by weight of a polyanionic compound,
   (c2) from 0.001 to 2% by weight of a polyol of formula $C_nH_{2n+2}O_n$, wherein n represents an integer between 2 and 10; and
   (d) an additional amount of an aqueous support.

2. The composition according to claim 1, comprising from 4 to 6% of said at least one deacetylated chitosan, or from 1 to 3% of said at least one organic or inorganic acid, or from 0.01 to 5% of said compound (c1), or from 0.5 to 1.5% of said compound (c2), or total or partial combinations thereof.

3. The composition according to claim 1, wherein the chitosan has a molar mass ranging from 10,000 to 500,000 g/mol.

4. The composition according to claim 1, wherein the acid is sulfuric acid in an aqueous solution or an organic acid selected from carboxylic acids in an aqueous solution.

5. The composition according to claim 4, wherein the carboxylic acid is acetic acid.

6. The composition according to claim 1, wherein the compound (c1) is selected from hydroxycarboxylic acids, polycarboxylic acids, hydroxypolycarboxylic acids, polysaccharides, salts or mixtures thereof.

7. The composition according to claim 1, wherein the compound (c1) is selected from citric acid salts or succinic acid salts.

8. The composition according to claim 1, wherein the compound (c1) is trisodium citrate dehydrate, or the compound (c2) is glycerol or mannitol.

9. The composition according to claim 1, for which the ratio (a)/(b) ranges from 3/1 to 10/3, or the ratio (a)/(c1) ranges from 1/2 to 200/1, or the ratio (a)/(c2) ranges from 2/1 to 12/1.

10. The composition according to claim 1, wherein the support (d) is water.

11. The composition according to claim 1, comprising:
   (a) from 3 to 10% by weight of at least one deacetylated chitosan having a deacetylation degree greater than or equal to 75%;
   (b) from 0.5 to 5% by weight of at least one organic or inorganic acid;
   (c1) from 0.001 to 8% by weight of a polyanionic compound;
   (c2) from 0.001 to 2% by weight of a polyol of formula $C_nH_{2n+2}O_n$ wherein n represents an integer between 2 and 10,
   (d) an additional amount of an aqueous support, and
   (e) from 0.1 to 20% by weight of a polysaccharide filler.

12. An adhesive composition comprising:
   (a) from 3 to 10% by weight of at least one de-acetylated chitosan having a deacetylation degree greater than or equal to 75%;
   (b) from 0.5 to 5% by weight of at least one organic or inorganic acid;
   (c) at least one compound selected from:
      (c1) from 0.001 to 8% by weight of a polyanionic compound,
      (c2) from 0.001 to 2% by weight of a polyol of formula $C_nH_{2n+2}O_n$,
   wherein n represents an integer between 2 and 20; and
   (d) an additional amount of an aqueous support; and
   (e) a polysaccharide filler comprising a starch from cereals.

13. The composition according to claim 12, comprising from 0.1 to 20% by weight of polysaccharide filler (e).

14. The composition according to claim 12, for which the ratio (a)/(e) ranges from 1/10 to 1/1.

15. An adhesive composition comprising:
   (a) from 3 to 10% by weight of at least one deacetylated chitosan having a deacetylation degree greater than or equal to 75%;
   (b) from 0.5 to 5% by weight of at least one organic or inorganic acid;
   (c) at least one compound selected from:
      (c1) from 0.001 to 8% by weight of a polyanionic compound,
      (c2) from 0.001 to 2% by weight of a polyol of formula $C_nH_{2n+2}O_n$, wherein n represents an integer between 2 and 20; and
   (d) an additional amount of an aqueous support,
      said adhesive composition having a shear strength ranging from 7 to 100 MPa.

16. The composition according to claim 15, comprising from 4 to 6% of said at least one deacetylated chitosan, or from 1 to 3% of said at least one organic or inorganic acid, or from 0.01 to 5% of said compound (c1), or from 0.5 to 1.5% of said compound (c2), or total or partial combinations thereof.

17. The composition according to claim 15, wherein the chitosan has a molar mass ranging from 10,000 to 500,000 g/mol.

18. The composition according to claim 15, wherein the acid is sulfuric acid in an aqueous solution or an organic acid selected from carboxylic acids in an aqueous solution.

19. The composition according to claim 18, wherein the carboxylic acid is acetic acid.

20. The composition according to claim 15, wherein the compound (c1) is selected from hydroxycarboxylic acids, polycarboxylic acids, hydroxypolycarboxylic acids, polysaccharides, salts or mixtures thereof.

21. The composition according to claim 15, wherein the compound (c1) is selected from citric acid salts or succinic acid salts.

22. The composition according to claim 15, wherein the compound (c1) is trisodium citrate dehydrate, or the compound (c2) is glycerol or mannitol.

23. The composition according to claim 15, for which the ratio (a)/(b) ranges from 3/1 to 10/3, or the ratio (a)/(c1) ranges from 1/2 to 200/1, or the ratio (a)/(c2) ranges from 2/1 to 12/1.

24. The composition according to claim 15, wherein the support (d) is water.

\* \* \* \* \*